United States Patent Office 3,444,174
Patented May 13, 1969

3,444,174
SUBSTITUTED 4,7-DIHYDROINDOLES
William Alan Remers, Suffern, N.Y., and Martin Joseph Weiss, Oradell, N.J., assignors to American Cyanamid Company, Stamford, Conn., a corporation of Maine
No Drawing. Filed Oct. 5, 1966, Ser. No. 584,355
Int. Cl. C07d 27/56, 29/26
U.S. Cl. 260—294.7        9 Claims

ABSTRACT OF THE DISCLOSURE

The preparation of substituted 4,7-dihydroindoles, are described. They are prepared from the corresponding indoles by treatment with an alkali metal or alkaline earth metals in liquid ammonia in the presence of an alkanol. The compounds of the invention are useful for their central nervous system depressant properties.

This invention relates to new organic compounds. More particularly, the invention relates to novel 4,7-dihydroindoles.

The novel compounds of this invention may be represented by the following formula:

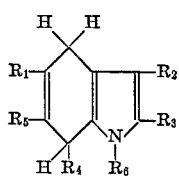

wherein $R_1$ is selected from the group consisting of hydrogen and lower alkoxy; $R_2$ is selected from the group consisting of hydrogen, amino-substituted lower alkyl, lower alkylamino-substituted lower alkyl, di-lower alkylamino-substituted lower alkyl, lower alkanoylamino-substituted lower alkyl, and N-(lower polymethyleneaza)-substituted lower alkyl; $R_3$ and $R_4$ are selected from the group consisting of hydrogen and lower alkyl; $R_5$ is selected from the group consisting of hydrogen, lower alkyl and lower alkoxy; and $R_6$ is selected from the group consisting of hydrogen and lower alkyl, with the proviso that when $R_2$ is hydrogen, then either $R_1$ or $R_5$ is lower alkoxy. The invention includes the nontoxic acid addition salts of the above compounds.

The compounds of this invention are in general, white crystalline compounds, insoluble in water and soluble in the usual organic solvents, such as for example, acetone or ether. The acid addition salts of these compounds are soluble in water.

The compounds of the present invention are physiologically active in warm-blooded animals as analgesics and central nervous system depressants at nontoxic doses. They are also useful as intermediates for the preparation of other and useful indoles. The compounds may be prepared by methods indicated in the flowsheet directly following.

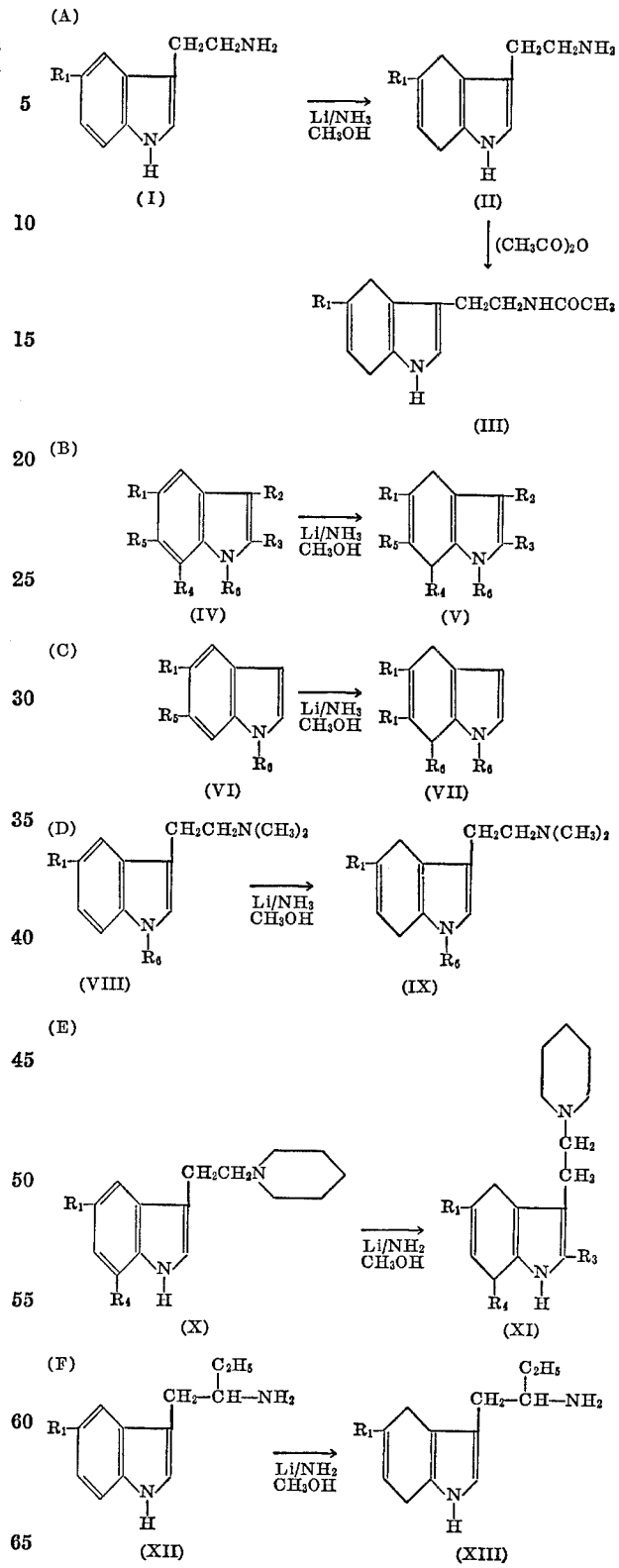

Flowsheet wherein $R_1$, $R_2$, $R_3$, $R_4$, $R_5$ and $R_6$ are as hereinbefore described.

Thus, treatment of substituted indoles, such as I, IV, VI, VIII, X and XII with an alkali metal or alkaline earth metal, preferably lithium, in liquid ammonia, followed by treatment with an alcohol such as, for example, methanol, affords the corresponding 4,7-dihydroindoles II, V, VII, IX, XI, and XIII, respectively. A 4,7-dihydroindole unsubstituted on the side-chain nitrogen, such as II, may be converted into a corresponding alkanoyl derivative such as III by treatment with a carboxylic acid anhydride such as acetic anhydride.

The preparation of 4,7-dihydroindoles by lithium in ammonia reduction of the corresponding indoles is a novel and useful application of the lithium in ammonia reaction. Many methods have been utilized for the reduction of indoles and tryptamines, but the products obtained have generally been 2,3-dihydroindoles (indolines) or products of reduction in both pyrrole and benzene rings.

The central nervous depressant properties of the compounds of the present invention are indicated by several procedures. For example, a test which indicates hypnotic and/or muscle relaxant type activity is represented by the following rod walking test. Groups of 6 mice each are tested for their ability to walk across a horizontal rod in a normal manner after receiving graded doses interperitoneally of a test compound. A median effective dose (called rod-walk dose or RWD) of the said compound is then estimated.

A test which indicates tranqualizing activity is represented by a measure of the reduction in motor activity. One-half of the above median effective dose is given to a group of 5 mice and a 5 minute count of motor activity is recorded with the use of an acetophotometer. Counts of 250 or less are considered to indicate a specific reduction statistically (more than two standard derivations) of activity at a dose causing only minimal impairment of neurological funciton as measured by rod walking ability. Compounds that appeared to reduce motor activity (equal to or less than 250 count) are administered to additional groups of 5 mice and tested similarly. The dose (motor depressant dose or MDD) which causes a 50% reduction of motor activity (a count of about 250) is estimated.

The invention will be described in greater detail in conjunction with the following specific examples.

EXAMPLE 1

Preparation of 4,7-dihydro-5-methoxytrpytamine (II)

A mixture of 2.4 g. of 5-methoxytrpytamine, 50 ml. of ether and 500 ml. of liquid ammonia is treated with 4.0 g. of lithium wire. The resulting mixture is stirred for 1 hour and then treated with methanol until the blue color is discharged. After evaporation of the ammonia, the residue is treated with water and methylene chloride. The organic layer is washed with water, dried over magnesium sulfate, and concentrated. Treatment of the residue with ether gives 1.27 g. of nearly white crystals which have melting point 100–114° C. after recrystallization from methylene chloride-hexane. RWD=84 mg./kg.; MDD=26 mg./kg. The above compound has analgesic activity.

EXAMPLE 2

Preparation of N-acetyl-4,7-dihydro-5-methoxytrpytamine (III)

A mixture of 665 mg. of 4,7-dihydro-5-methoxytryptamine (Example 1) and 10 ml. of water is treated with drops of acetic acid until a clear solution is obtained. To this solution is added excess sodium acetate and 0.4 ml. of acetic anhydride. The mixture is chilled in an ice bath and the solid which forms is collected, washed with dilute sodium bicarbonate solution and dried in air. Recrystallization from acetone-hexane gives colorless prisms, melting point 137–139° C.

EXAMPLE 3

Preparation of 2,7-dimethyl-5-hydroxyindole

A mixture of 24.5 g. of ethyl 2,7-dimethyl-5-hydroxyindole-3-indolecarboxylate (Chemistry and Industry, 1965, 2096) and 750 ml. of 20% hydrochloric acid solution is heated at reflux temperature, under nitrogen, for 2 hours. The resulting solution is cooled, its pH is adjusted to 6.5 and it is extracted with ethyl acetate. The extract is dried and concentrated and the residue is crystallized from methylene chloride. The procedure gives 6.97 g. of white crystals, melting point 144–146° C.

EXAMPLE 4

Preparation of 2,7-dimethyl-5-methoxyindole

A magnetically stirred solution of 6.58 g. of 2,7-dimethyl-5-hydroxyindole (Example 3) in 73 ml. of ethanol and 147 ml. of 2 N sodium hydroxide is treated, under nitrogen, with 18 ml. of methylol sulfate and the mixture is heated at reflux temperature for 1 hour. The cooled mixture is diluted with water and extracted with ethyl acetate. This extract is washed with water, dried, and concentrated and the residue is purified by adsorption chromatography on a magnesia-silica gel column. This procedure gives 5.99 g. of yellow crystals, melting point 69–71° C.

EXAMPLE 5

Preparation of 2,7-dimethyl-5-methoxyindole-3-N,N-dimethylglyoxylamide

A solution of 2.0 g. of 2,7-dimethyl-5-methoxyindole (Example 4) in 70 ml. of ether at 0° C. is treated dropwise with 1.72 ml. of oxalyl chloride in 5 ml. of ether. The mixture is stirred for 30 minutes and then filtered. The yellow solid thus obtained is added portionwise to 40 ml. of ice cooled 25% aqueous dimethylamine. After 30 minutes the resulting mixture is filtered. This procedure gives 1.40 g. of white crystals, melting point 252–254° C.

EXAMPLE 6

Preparation of 2,7-dimethyl-5-methoxy-N,N-dimethyltryptamine (IV)

A suspension of 1.1 g. of 2,7-dimethyl-5-methoxyindole-3-N,N-dimethylglyoxylamide (Example 5) in 100 ml. of tetrahydrofuran in treated portionwise with 1.53 g. of lithium aluminum hydride. The mixture is heated at reflux temperature for 48 hours, cooled, and treated with 10 ml. of saturated sodium potassium tartrate solution. Crystallization from ether of the solid which forms affords 656 mg. of white crystals, melting point 115–116° C.

EXAMPLE 7

Preparation of 4,7-dihydro-2,7-dimethyl-5-methoxy-N,N-dimethyltryptamine (V)

Treatment of 2,7-dimethyl-5-methoxy-N,N-dimethyltryptamine (Example 6) by the procedure described in Example affords crude 4,7 - dihydro - 2,7 - dimethyl - 5-methoxy-N,N-dimethyltryptamine, which after purification by partition chromatography is a white solid, melting point 80–83° C.

EXAMPLE 8

Preparation of 2,6-dimethyl-5-hydroxyindole

Treatment of ethyl 2,6-dimethyl-5-hydroxyindole-3-indolecarboxylate (Chemistry and Industry, 1965, 2096) by the procedure described in Example 3 affords white crystals, melting point 177–181° C.

EXAMPLE 9

Preparation of 2,6-dimethyl-5-methoxyindole

Treatment of 2,6-dimethyl-5-hydroxyindole (Example 8) in place of 2,7-dimethyl-5-hydroxyindole by the procedure described in Example 4, gives white crystals, melting point 101–103° C.

EXAMPLE 10

Preparation of 2,6-dimethyl-5-methoxyindole-3-N,N-dimethylglyoxylamide

Treatment of 2,6-dimethyl-5-methoxyindole (Example 9) in place of 2,7-dimethyl-5-methoxyindole by the procedure described in Example 5 gives the desired product as a colorless glass, λmax. 6.24μ.

EXAMPLE 11

Preparation of 2,6-dimethyl-5-methoxy-N,N-dimethyltryptamine (IV)

Treatment of 2,6-dimethyl-5-methoxyindole-3-N,N-dimethylglyoxylamide (Example 10) in place of 2,7-dimethyl-5-methoxyindole-3-N,N-dimethylglyoxylamide by the procedure described in Example 6 gives a colorless oil. This oil forms with maleic acid a maleate salt, melting point 150–151° C.

EXAMPLE 12

Preparation of 4,7-dihydro-2,6-dimethyl-5-methoxy-N,N-dimethyltryptamine (V)

Treatment of 2,6-dimethyl-5-methoxy-N,N-dimethyltryptamine (Example 11) in place of 5-methoxytryptamine by the procedure described in Example 1 gives the desired product as a colorless oil, λmax. 6.0μ.

EXAMPLE 13

Preparation of 4,7-dihydro-5-methoxy-N,N-dimethyltryptamine (IX)

Treatment of 5-methoxy-N,N-dimethyltryptamine in place of 5-methoxytryptamine by the procedure described in Example 1 gives white prisms, melting point 91–93° C. The above compound has analgesic activity.

EXAMPLE 14

Preparation of 2,7-dimethyl-5-methoxyindole-3-(N-piperidino)glyoxylamide

Treatment of 2,7-dimethyl-5-methoxyindole (Example 4) with oxalyl chloride and with piperidine by the procedure described in Example 5 gives the desired product as white crystals, melting point 113–116° C.

EXAMPLE 15

Preparation of 2,7-dimethyl-5-methoxy-N,N-pentamethylenetryptamine (X)

Treatment of 2,7-dimethyl-5-methoxyindole-3-(N-piperidino)glyoxylamide (Example 14) in place of 2,7-dimethyl-5-methoxyindole-3-N,N-dimethylglyoxylamide by the procedure described in Example 6 affords the desired product as white crystals. The maleate salt of this product has melting point 150–152° C.

EXAMPLE 16

Preperation of 4,7-dihydro-2,7-dimethyl-5-methoxy-N,N-pentamethylenetryptamine (XI)

Treatment of 2,7-dimethyl-5-methoxy-N,N-pentamethylenetryptamine (Example 15) in place of 5-methoxytryptamine by the procedure described in Example 1 affords the desired product in admixture with starting material. Resolution of this mixture by liquid-liquid partition chromatography gives the pure product, λmax. 6.0μ.

EXAMPLE 17

Preparation of 4,7-dihydro-5-methoxyindole (VII)

A mixture of 2 g. of 5-methoxyindole, 50 ml. of ether and 500 ml. of liquid ammonia is treated with 4.0 g. of lithium wire. The resulting mixture is stirred for 1 hour and then treated with methanol until the blue color is discharged. After evaporation of the ammonia, the residue is treated with water and methylene chloride. The organic layer is washed with water, dried over magnesium sulfate and concentrated. Treatment of the residue with ether gives the desired product as colorless prisms, melting point 65–68° C. The above compound has analgesic activity.

EXAMPLE 18

Preparation of 4,7-dihydro-6-methoxyindole (IV)

Treatment of 6-methoxyindole in place of 5-methoxyindole in the procedure described in Example 17 gives the desired product, λmax. 6.0μ.

EXAMPLE 19

Preparation of 4,7-dihydro-5-methoxy-1-methyl-N,N-dimethyltryptamine (IX)

Treatment of 5-methoxy-1-methyl-N,N-dimethyltryptamine [J. Org. Chem., 23, 1977 (1938)] in place of 5-methoxyindole in the procedure described in Example 17 followed by purification by partition chromatography in a heptane-methanol system on diatomaceous earth, gives the product as an amber oil, λmax. 6.0μ.

EXAMPLE 20

Preparation of 4,7-dihydro-α-ethyltryptamine (XIII)

Treatment of α-ethyltryptamine by the procedure described in Example 1 affords the desired product as an amber solid, melting point 76–79° C. Treatment of this solid with acetic acid in ether gives the acetate salt as white crystals, melting point 141–143.5° C.

What is claimed is:

1. A substituted 4,7-dihydroindole selected from the group consisting of compounds of the formula:

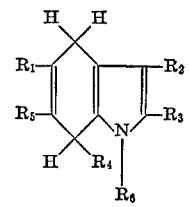

wherein $R_1$ is selected from the group consisting of hydrogen and lower alkoxy; $R_2$ is selected from the group consisting of hydrogen, omega amino lower alkyl, omega lower alkylamino lower alkyl, omega di-loweralkylamino lower alkyl, omega lower alkanoylamino lower alkyl, and omega N-piperidino lower alkyl; $R_3$ and $R_4$ are selected from the group consisting of hydrogen and lower alkyl; $R_5$ is selected from the group consisting of hydrogen, lower alkyl and lower alkoxy; and $R_6$ is selected from the group consisting of hydrogen and lower alkyl with the proviso that when $R_2$ is hydrogen, at least one of $R_1$ and $R_5$ is lower alkoxy; and nontoxic acid addition salts.

2. The 4,7-dihydroindole according to claim 1; 4,7-dihydro-5-methoxytryptamine.

3. The 4,7-dihydroindole according to claim 1; 4,7-dihydro-2,7-dimethyl-5-methoxy-N,N-dimethyltryptamine.

4. The 4,7-dihydroindole according to claim 1; 4,7-dihydro-5-methoxy-N,N-dimethyltryptamine.

5. The 4,7-dihydroindole according to claim 1; 4,7-dihydro - 2,7 - dimethyl - 5 - methoxy - N,N - pentamethylenetryptamine.

6. The 4,7-dihydroindole according to claim 1; 4,7-dihydro-5-methoxyindole.

7. The 4,7-dihydroindole according to claim 1; 4,7-dihydro-6-methoxyindole.

8. The 4,7-dihydroindole according to claim 1; 4,7-dihydro-5-methoxy-1-methyl-N,N-dimethyltryptamine.

9. The 4,7-dihydroindole according to claim 1; 4,7-dihydro-α-ethyltryptamine.

References Cited

O'Brien et al.: Chemical Society Journal, 1960, p. 4, pp. 4609–4612.

EHRET: Smith's College Chemistry, 7th ed., 1960, pp. 86–87.

HENRY R. JILES, *Primary Examiner*.

S. WINTERS, *Assistant Examiner*.

U.S. Cl. X.R.

260—293, 326.13, 326.15, 326.16, 999